Patented May 28, 1940

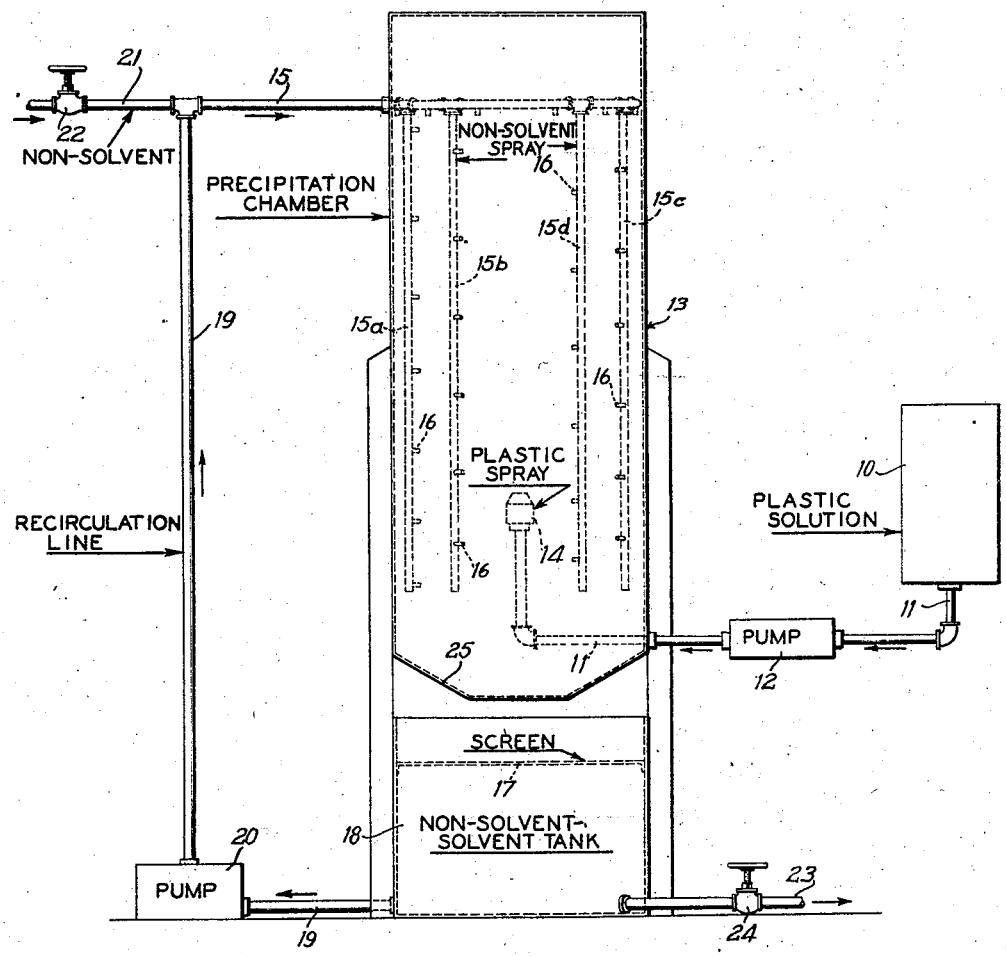

2,202,481

UNITED STATES PATENT OFFICE 2,202,481

RECOVERY OF PLASTIC MATERIALS

Henry L. Cox, South Charleston, and Jacob D. Matlack, Charleston, W. Va., assignors to Carbide and Carbon Chemicals Corporation, a corporation of New York Application November 20, 1937, Serial No. 175,560

10 Claims. (Cl. 260—2)

This invention is concerned with the recovery of heat sensitive plastic materials in finely divided solid form from solutions of these materials in organic solvents. The invention provides a process for precipitating plastic materials, especially thermoplastic artificial resins, from their solutions in a continuous, simple, economical fashion whereby the solvent is rapidly eliminated to yield the solid plastic in a state of very fine subdivision in which it can be readily reduced to complete dryness.

In the formation of various plastic materials in solid, dry form from their solutions, it has been customary to add the solution to a body of non-solvent liquid, or the converse, and to cause the material to precipitate in finely divided form by employing agitation of one or both bodies of liquid. The solvent and non-solvent liquids may then be decanted and the material dried, or purified by washing or other means. This procedure requires cumbersome equipment and is rather tedious in operation. Simple evaporation of the solvent also may be employed, but this may require temperatures which adversely affect the plastic, and the residue of plastic is, of course, not in finely divided form. A variant of this latter procedure may take the form of a spray drying operation in which the solution of plastic in the form of small droplets is admitted to an evaporative atmosphere. This produces finely divided materials, but may require temperatures in excess of those to which the material can be subjected without deterioration, or which may cause fusion and agglomeration of the particles of plastic material.

The principal object of this invention is to provide a process which largely avoids the difficulties of the above-mentioned methods for recovering plastics from solutions, and it makes possible the recovery of plastic materials in finely divided solid form without subjecting them to elevated temperatures by means independent of the volatility of the solvent. Other objects of the invention will be seen from the description and the accompanying drawing, in which the method of conducting the new process is illustrated diagrammatically.

In brief, the objects of the invention are achieved and heat sensitive plastic materials are efficiently and economically recovered from their solutions by bringing the solution in the form of fine droplets into a confined space filled or largely filled with a mist or fog of a non-solvent for the material. The plastic thus is thrown out of solution in the form of small particles, which can be collected on a screen or the like, and the descending mixture of non-solvent and solvent liquids pass through this screen to be collected separately from the solid material. The finely divided solid plastic then can readily be completely freed from liquids, and the mixture of non-solvent and solvent can be separated into its components for reuse.

The new process can be advantageously applied to many types of heat sensitive plastic substances. A few of those to which it has been successfully applied are cellulose esters, such as the acetate; vinyl resins, such as the polymers of vinyl acetate and other vinyl esters of organic acids, polyvinyl halides, polystyrene resins, resins resulting from the polymerization of mixtures of different types of vinyl esters, such as mixtures of vinyl acetate and vinyl chloride, and vinyl acetal resins resulting from the condensation of aldehydes with polyvinyl alcohol or hydrolized polyvinyl esters; acrylic acid ester polymers; condensation products of polyhydric alcohols and polybasic acids, such as the glyceryl phthalate type resins; and chlorinated rubber compounds. In the case of materials which require removal of impurities which are soluble in the precipitating liquid the new process is unique in the degree of removal obtainable, due to the fineness of the particles. Known methods of precipitation produce larger particles, and the drying methods effect no removal of non-volatile impurities.

Referring to the drawing, the solution of plastic material in an organic solvent is supplied from a tank 10 by way of a line 11, through which it is fed under pressure applied by a pump 12. The line 11 enters a vertical chamber or precipitator 13 at a point near its bottom, and the solution is atomized or otherwise broken into small droplets by means of a spray nozzle 14 or similar suitable device. A non-solvent liquid is fed to the precipitator 13 through a line 15, from which a number of branch lines 15a, 15b, 15c and 15d convey it to a plurality of spray nozzles 16 which liberate the non-solvent in the form of a voluminous spray or fog or mist. Other devices capable of producing this or an equivalent result may, of course, replace the nozzles 16. The solution may be atomized near the top in a downward direction but better results are usually produced by an ascending spray.

The ascending droplets of the solution of plastic material come in contact with the mist or fog of non-solvent, and the dissolved material is precipitated to fall through the precipitator 13 to a collecting screen 17. Below the screen 17 is provided a storage tank 18 in which is collected the liquid mixture of solvent and non-solvent which descends from the precipitator 13. This mixture of solvent and non-solvent may be circulated back to the nozzles 16 by means of a line 19, through which it is moved under pressure by a pump 20. Additional non-solvent may be supplied through a line 21 controlled by a valve 22. The mixture collected in the tank 18 from time to time, or continuously, may be withdrawn through a line 23 controlled by a valve 24. The mixture thus removed can be separated by any suitable means for recovery of its individual components.

The plastic material in the form of small particles may be removed continuously or at intervals from the collecting screen 17. It will be obtained in every case free from excess of liquid, and in excellent condition for removal of the absorbed liquid by a brief and simple drying operation. A conical baffle 25 may be provided, if desired, to direct the particles of plastic on to the collecting screen 17. The screen 17 can be in the form of a conveyor, if desired, to allow the solid plastic particles to be removed continuously and at any desired rate.

The following examples will serve to illustrate the invention:

Example 1

The precipitator 13 employed provided 21.5 cubic feet of free vapor space. Water, as the non-solvent liquid, was supplied as a fine mist through the nozzles 16, of which thirty-two were employed. The water was fed at lowest available cooling water temperature, or, in this case, about 25° to 30° C. The gauge pressure on the water misting nozzles was about 80 pounds per square inch.

The plastic solution consisted of a partial polyvinyl acetal resin (in which the combined aldehyde was butyraldehyde and the degree of acetalization was about 66%) dissolved in methanol. This solution contained 8.2% solids, and its viscosity was 0.85 poise. The resin solution was supplied to the spray nozzle 14 at a pressure of 300 to 400 pounds per square inch and a temperature of 25° C. The spray nozzle 14, under these conditions, atomized the resin solution to produce drops of about 0.010 to 0.025 inch in diameter.

The droplets of resin solution entering the mist of water were instantly penetrated to precipitate solid particles of resin, which were collected on the screen 17. In this case the screen was formed of 100 mesh nickel alloy wire. The water served additionally to wash the resin particles as it passed through the screen 17 to be collected in the tank 18 in admixture with the methanol.

The resin was removed from the screen 17 as a fine white powder, which was centrifuged to remove excess liquids, and finally dried at 30° C. This operation of the process produced 10 pounds of dried resin powder per hour.

Example 2

Following the procedure of Example 1, a vinyl resin resulting from the conjoint polymerization of vinyl acetate with vinyl chloride, containing about 60% by weight of vinyl chloride in the polymer, was recovered from its solution in acetone. The solution had a viscosity of less than 0.65 poise, and it was supplied to the apparatus at a temperature of 32° C. and under a gauge pressure of 150 pounds per square inch. The solution contained 36.4% solids, The resin was obtained as an exceptionally fine, white powder which required no further treatment prior to drying. Approximately 46.5 pounds of dried resin powder were produced each hour of operation.

Example 3

Results similar to those of Example 2 were obtained in the same way by treatment with water as the non-solvent of an acetone solution of a vinyl resin resulting from the conjoint polymerization of vinyl chloride with vinyl acetate in which the resin contained about 87% by weight of vinyl chloride in the polymer. This solution contained 15% solids and was atomized at a gauge pressure of 200 pounds per square inch. It had a viscosity of 0.65 poise and was supplied at a temperature of 32° C. About 19 pounds of dried resin powder were produced per hour.

An acetone solution of the vinyl resin just described also was treated using a mixture of water and isopropyl alcohol as the non-solvent. This non-solvent liquid contained 91% isopropanol and 9% water by volume. The resin solution contained 18.7% solids and had a viscosity of 0.65 poise. It was atomized at 31° C. at a gauge pressure of 300 to 500 pounds per square inch. The dried powdered resin was obtained at the rate of 24 pounds per hour.

Example 4

The resin solution described in Example 2 was treated as in that example, using a mist of gasoline as the non-solvent. The solution of resin was atomized at a gauge pressure of 200 pounds per square inch. The resin was precipitated as very fine white particles which tended to coalesce while wet with the mixture of solvent and non-solvent. After drying, the resin was easily broken into a powder.

The process just described was repeated, using di-n-butyl ether as the non-solvent liquid. Similar results were obtained.

Example 5

An alkyd resin, of the unmodified glyceryl phthalate type, dissolved in acetone was recovered in solid form by means of the process described in the preceding examples. The solution was atomized into a mist of water under a pressure of 100 to 200 pounds per square inch. The solution used contained 10% solids and had a viscosity of less than 1 poise. Its temperature was 31° C. The resin was collected in the form of a white, finely divided powder which was readily dried.

Example 6

Polymerized methyl acrylate resin was similarly precipitated and dried. This material also was recovered from an acetone solution of the same solids content, viscosity and temperature as the alkyd resin solution. The non-solvent used was water, and the resin solution was atomized at a gauge pressure of 400 to 500 pounds per square inch. The product was a very fine, white powdered form of the resin.

Example 7

An acetone solution of cellulose acetate containing 56% combined acetic acid was treated as described above, using water as the non-solvent. The solution contained 5% solids and was fed to the process at a temperature of 31° C. Its viscosity was less than 1 poise, and the atomizing pressure used was between 300 and 400 pounds per square inch gauge pressure.

The cellulose acetate was recovered as a white, voluminous powder of small particle size.

Non-solvent liquids other than those named may be used in this process, and the non-solvent should be supplied at a rate which will insure rapid penetration and thorough contact of the droplets of plastic solution with the non-solvent. The solvent from which the materials are recovered is of no particular consequence, and its degree of volatility has no effect on the process. In any case, however, it is usually necessary to select a non-solvent which is at least partly miscible with the particular solvent under consideration.

The non-solvent can be supplied to the interior of the precipitating device by any convenient means, and the particle size of the droplets of non-solvent has no major effect on the process. The spraying or distribution of the plastic solution is important, and it is usually preferable to reduce the solution to a very small drop size to insure thorough penetration by the non-solvent. Also, the particle size of the solid plastic is directly proportional to the drop size of the solution when it comes in contact with the non-solvent mist or spray. Any standard atomizing nozzle, slotted spinning bowl or similar device can be used to introduce the solution to the process. Preferably, the drop size of the solution is kept below 0.025 inch in diameter, and this is conveniently done by spraying solutions of less than 1 poise viscosity through atomizing nozzles under gauge pressures of at least 100 pounds per square inch. Solutions of higher viscosity can be successfully treated in this process if suitable atomizing equipment is provided.

It is preferred to operate the process at atmospheric temperature, but either higher or lower temperatures can be used if required.

The process shown above has many advantages in that it requires but a short time for precipitation, uniformly finely divided and purified particles are obtained, recovery of the finely divided solid material is continuous, and the process is economical due to its simplicity, which reduces power and labor costs.

Various modifications of the process and the equipment for its conduct will be apparent, and such variations are included within the scope of the invention as defined by the appended claims.

We claim:

1. In the production of heat sensitive thermoplastic materials, the step of preparing the material in finely divided solid form which comprises dividing a solution of the material in an organic solvent into fine droplets and bringing it into contact with a fine spray of a non-solvent for the material which is at least partially miscible with the organic solvent, while maintaining the thermoplastic material at a temperature sufficiently low to prevent injury thereto.

2. Process for precipitating heat sensitive thermoplastic materials in finely divided solid form which comprises projecting a fine spray of the material dissolved in an organic solvent into a confined space containing in suspension fine droplets of a non-solvent for the material which is at least partially miscible with the organic solvent, and thereafter separating the solid particles of plastic material from the mixture of solvent and non-solvent while maintaining the thermoplastic material at a temperature below its softening point.

3. Process for obtaining vinyl resins in finely divided solid form which comprises bringing a solution of the vinyl resin in an organic solvent, in the form of fine droplets, into contact with a spray of a non-solvent for the resin which is at least partially miscible with the organic solvent, and thereafter separating the finely divided solid resin from the mixture of solvent and non-solvent, said vinyl resin being maintained at a temperature below its softening point.

4. Process for obtaining in finely divided solid form vinyl resins made by the conjoint polymerization of a vinyl halide with a vinyl ester of a lower aliphatic acid, which comprises spraying a solution of said resin in an organic solvent in the presence of a suspension of fine droplets of a non-solvent for the resin which is at least partially miscible with said organic solvent.

5. Process for obtaining partial polyvinyl acetal resins in finely divided solid form, which comprises spraying a solution of said resin in an organic solvent in the presence of a suspension of fine droplets of a non-solvent for the resin which is at least partially miscible with said organic solvent.

6. Process for obtaining in finely divided solid form vinyl resins made by the conjoint polymerization of vinyl chloride with vinyl acetate, which comprises spraying a solution of said resin in an organic solvent in the presence of a suspension of fine droplets of a non-solvent for the resin which is at least partially miscible with said organic solvent, said resin being maintained at a temperature below its softening point.

7. Process for obtaining in finely divided solid form vinyl resins made by the conjoint polymerization of vinyl chloride with vinyl acetate, which comprises bringing small droplets of a solution of said resin in an organic solvent into a mist or fog of water, said resin being maintained at a temperature below its softening point.

8. Process for obtaining in finely divided solid form polyvinyl acetal resins acetalized incompletely with aldehydes, which comprises bringing small droplets of a solution of said resin in an organic solvent into a mist or fog of water.

9. In the production of vinyl resins resulting from the conjoint polymerization of vinyl chloride with vinyl acetate containing between 60% and 95% vinyl chloride in the polymer, the step of obtaining said resin in finely divided solid form from solutions thereof in acetone which comprises bringing the solution in a state of fine subdivision into the presence of water in the form of fine droplets, and thereafter separating the finely divided solid resin from the mixture of water and acetone, said resin being maintained at a temperature below its softening point.

10. In the production of vinyl resins resulting from the incomplete acetalization of polymerized vinyl alcohol with butyraldehyde, the step of obtaining said resin in finely divided solid form from solutions thereof in methanol which comprises bringing the solution in a state of fine subdivision into the presence of water in the form of fine droplets, and thereafter separating the finely divided solid resin from the mixture of water and methanol, said resin being maintained at a temperature below its softening point.

HENRY L. COX.
JACOB D. MATLACK.